United States Patent
Lee et al.

(10) Patent No.: US 11,328,249 B2
(45) Date of Patent: *May 10, 2022

(54) COMPUTERIZED SYSTEMS AND METHODS FOR ADDRESS CORRECTION

(71) Applicant: COUPANG CORP., Seoul (KR)

(72) Inventors: Hanjun Lee, Seoul (KR); Kyoungwook Lee, Yongin-si (KR); Hansham Jeon, Seoul (KR); Hyunsu Lim, Seoul (KR); Taeho Song, Seoul (KR)

(73) Assignee: COUPANG CORP., Seoul (KR)

( * ) Notice: Subject to any disclaimer, the term of this patent is extended or adjusted under 35 U.S.C. 154(b) by 249 days.

This patent is subject to a terminal disclaimer.

(21) Appl. No.: 16/805,647

(22) Filed: Feb. 28, 2020

(65) Prior Publication Data
US 2021/0019700 A1    Jan. 21, 2021

Related U.S. Application Data

(63) Continuation of application No. 16/511,610, filed on Jul. 15, 2019, now Pat. No. 10,607,179.

(51) Int. Cl.
*G06Q 10/08*    (2012.01)
*G06F 16/23*    (2019.01)
*G06F 16/29*    (2019.01)

(52) U.S. Cl.
CPC ..... *G06Q 10/0838* (2013.01); *G06F 16/2365* (2019.01); *G06F 16/2379* (2019.01); *G06F 16/29* (2019.01); *G06Q 10/08355* (2013.01)

(58) Field of Classification Search
CPC .......... G06Q 10/0838; G06Q 10/08355; G06F 16/2365; G06F 16/29; G06F 16/2379
See application file for complete search history.

(56) References Cited

U.S. PATENT DOCUMENTS

2002/0029248 A1 * 3/2002 Cook ................. G06Q 30/0601
709/206
2006/0058914 A1    3/2006 Dearing
(Continued)

FOREIGN PATENT DOCUMENTS

CN        102077515 A    5/2011
CN        107004175 A    8/2017
(Continued)

OTHER PUBLICATIONS

Shikhar Sharma, Ritesh Ratti, Ishaan Arora, Anshul Solanki, Gaurav Bhatt,, Automated Parsing of Geographical Addresses: A Multilayer Feedforward Neural Network Based Approach, Jan. 1, 2018, IEEE, pp. 123-130 (Year: 2018).*
(Continued)

*Primary Examiner* — George Chen
*Assistant Examiner* — Ismail A Manejwala
(74) *Attorney, Agent, or Firm* — Finnegan, Henderson, Farabow, Garrett & Dunner LLP

(57) ABSTRACT

A computer-implemented system for correcting address information. The system may include a memory storing instructions and at least one processor configured to execute the instructions to perform operations. The operations may include requesting an address for normalization from at least one of a current address or a residential history of a user; receiving, from a user device, a user input including requested address information responsive to the request for normalization; searching, based on the user input, a cache to determine whether a refined version of the requested address is available; returning, based on a determination that a refined version of the requested address exists in the cache, a refined address as the normalized address to the user; and beginning to transport a package to the user at the normalized address, by providing instructions to a mobile device (Continued)

associated with a delivery worker, to transport the package to the normalized address.

17 Claims, 12 Drawing Sheets

(56) References Cited

U.S. PATENT DOCUMENTS

| | | | | |
|---|---|---|---|---|
| 2008/0255758 | A1* | 10/2008 | Graham | G08G 1/20 701/469 |
| 2010/0324959 | A1* | 12/2010 | Templeton | G06Q 10/087 705/334 |
| 2015/0199643 | A1* | 7/2015 | Hubner | G06Q 10/0833 705/333 |

FOREIGN PATENT DOCUMENTS

| | | |
|---|---|---|
| CN | 108320340 A | 7/2018 |
| JP | 2004-0054838 A | 1/2004 |
| JP | 2011-219181 A | 11/2011 |
| JP | 2015-167905 A | 9/2015 |
| KR | 10-2005-0091392 A | 9/2005 |
| KR | 10-0911762 B1 | 8/2009 |
| KR | 10-2010-0106740 A | 10/2010 |

OTHER PUBLICATIONS

Written Opinion of the International Searching Authority for Application PCT/IB2020/056169, dated Oct. 7, 2020, (6 pages).
International Search Report for Application PCT/IB2020/056169, dated Oct. 7, 2020, (5 pages).
Shikhar Sharma et al., "Automated Parsing of Geographical Addresses: A Multilayer Feedforward Neural Network Based Approach," Jan. 1, 2018, *IEEE* pp. 123-130 (2018).
Examination Notice in counterpart application Hong Kong Application No. 22020010246.9 dated Jun. 11, 2021 (7 pages).
Office Action in counterpart Korean Application No. 10-2019-0109389 dated Aug. 12, 2021 (10 pages).
Office Action in counterpart Taiwanese Office Action No. 110106684 dated May 6, 2021 (6 pages).
Office Action in counterpart Taiwanese Application No. 110144341 dated Jan. 7, 2022 (6 pages).

* cited by examiner

11/28/2018                          Shopping Cart

| General Purchasing (1) | Periodic Delivery (0) |

☑ Select All        Product Information        Item Amount   shipping fee

Rocket shipping products   free shipping

☑   Mozzarella cheese, 1kg, 2 pieces
Tomorrow (Thursday) 11/29
Arrival guarantee (order before 12 pm)

20,510 won      [1 ▼]   free

| Even if you add other rocket shipping products, free shipping available | shipping Free   Order amount $20.00 |

☑ Select All (1/1)   [Delete all]   [sold out / discontinued products clear all]   [interest payment]

$__.00

[Continue shopping]   [Buy now]

Customers who bought this product also purchased

1/5

Rosé spaghetti sauce,    Napoli Chunky Tomato    Grated Parmesan    Bacon and Mushroom Cream
600g, 2 pieces             Pasta Sauce,               cheese,                 Pasta Sauce,
6,500 won                3,800 won                6,460 won            4,870 won
(54 won per 10g)         (86 won per 10g)        (285 won per 10g)    (108 won per 10g)

FIG. 1D

COMPUTERIZED SYSTEMS AND METHODS FOR ADDRESS CORRECTION

CROSS-REFERENCE TO RELATED APPLICATIONS

This application is a continuation of and claims the benefit of priority to U.S. application Ser. No. 16/511,610, filed Jul. 15, 2019 (now allowed), the contents of which are incorporated herein by reference in their entirety.

TECHNICAL FIELD

The present disclosure generally relates to computerized systems and methods for address correction. In particular, embodiments of the present disclosure relate to inventive and unconventional systems for machine learning and automatic correction and display of corrected addresses based on user input to optimize delivery outcomes.

BACKGROUND

Computerized systems enable users to enter their addresses for receiving a shipment. Users may enter their address in many forms (street name, apartment name, apartment number, city, etc.). However, sometimes users input incorrect information. For example, sometimes a user may misspell a street name or include an incorrect numeral as part of a street address. Other times, a user will input correct information, but that information will be non-standard and thus difficult to properly map or locate for sending to other systems (e.g., to a delivery worker's device). For example, a user may input a postal code but may only include the first digits of the postal code (and not the remaining digits of a full postal code number), or a user may enter an abbreviation for a street name that is not a standard abbreviation. As a result, this address information may be difficult to map or locate for sending to other systems.

Current address correction systems may provide for correction of misspellings and may standardize non-standard address input. Current address correction systems may also provide a user interface for entry and storage of multiple addresses and may allow for display of a corrected address for the user. For example, a user may enter a shipping address for an online purchase of a product, and current corrected address systems may fix or correct the shipping address for display to the user before the user approves and subsequently completes purchase of the online product. In this instance, a user may be able to review and approve the corrected address before proceeding to the next step of the online purchase. However, current addresses correction systems are limited in the user interfaces that may be displayed to a user and are limited in the type of errors in input address information that they may be able to detect and correct. Furthermore, current address correction systems are unable to analyze address information over time to determine patterns for automatic correction of new address input.

Therefore, what is needed is a system that is capable of enabling receipt of an address from a user (e.g., via a website form, via a mobile device, or from a user database). Further, what is needed is a system that will consider an address and determine whether the address is abnormal in any way. This may include comparing addresses against maps, known location information (e.g., names, apartment names, etc.), and checking the spelling of addresses. Finally, what is needed are improved methods and systems for automatic address correction to check for patterns to determine common mistakes that users make and to develop patterns for automatic correction of future addresses.

SUMMARY

One aspect of the present disclosure is directed to a computerized system for address correction. The system may include a memory and a processor configured to execute instructions to perform operations. The operations may include requesting an address for normalization from at least one of a current address or a residential history of a user; receiving, from a user device, a user input including requested address information responsive to the request for normalization; searching, based on the user input, a cache to determine whether a refined version of the requested address is available; returning, based on a determination that a refined version of the requested address exists in the cache, a refined address as the normalized address to the user; beginning to transport a package to the user at the normalized address, by providing instructions to a mobile device associated with a delivery worker, to transport the package to the normalized address; comparing, while the package is in transit, the normalized address location to a current location of the delivery worker; if it is determined that the normalized address location does not match the current location of the delivery worker: transmitting a warning to the user device; correcting the normalized address, based on a machine learning process; storing, based on the correction, the corrected normalized address in a database; and providing instructions to deliver the package to the user at the delivery location based on the normalized address or the corrected normalized address.

Another aspect of the present disclosure is directed to a computerized method for address correction. The method may perform operations including requesting an address for normalization from at least one of a current address or a residential history of a user; receiving, from a user device, a user input including requested address information responsive to the request for normalization; searching, based on the user input, a cache to determine whether a refined version of the requested address is available; returning, based on a determination that a refined version of the requested address exists in the cache, a refined address as the normalized address to the user; beginning to transport a package to the user at the normalized address, by providing instructions to a mobile device associated with a delivery worker, to transport the package to the normalized address; comparing, while the package is in transit, the normalized address location to a current location of the delivery worker; if it is determined that the normalized address location does not match the current location of the delivery worker: transmitting a warning to the user device; correcting the normalized address, based on a machine learning process; storing, based on the correction, the corrected normalized address in a database; and providing instructions to deliver the package to the user at the delivery location based on the normalized address or the corrected normalized address.

Yet another aspect of the present disclosure is directed to a non-transitory computer readable medium comprising executable instructions that when executed by at least one processing device cause the at least one processing device to correct address information and perform operations comprising requesting an address for normalization from at least one of a current address or a residential history of a user; receiving, from a user device, a user input including requested address information responsive to the request for normalization; searching, based on the user input, a cache to determine whether a refined version of the requested address is available; returning, based on a determination that a refined version of the requested address exists in the cache, a refined address as the normalized address to the user; beginning to transport a package to the user at the normalized address, by providing instructions to a mobile device associated with a delivery worker, to transport the package to the normalized address; comparing, while the package is in transit, the normalized address location to a current location of the delivery worker; if it is determined that the normalized address location does not match the current location of the delivery worker: transmitting a warning to the user device; correcting the normalized address, based on a machine learning process; storing, based on the correction, the corrected normalized address in a database; and providing instructions to deliver the package to the user at the delivery location based on the normalized address or the corrected normalized address.

Other systems, methods, and computer-readable media are also discussed herein.

BRIEF DESCRIPTION OF THE DRAWINGS

FIG. 1D depicts a sample Cart page that includes items in a virtual shopping cart along with interactive user interface elements, consistent with the disclosed embodiments.

DETAILED DESCRIPTION

Figure 1A:
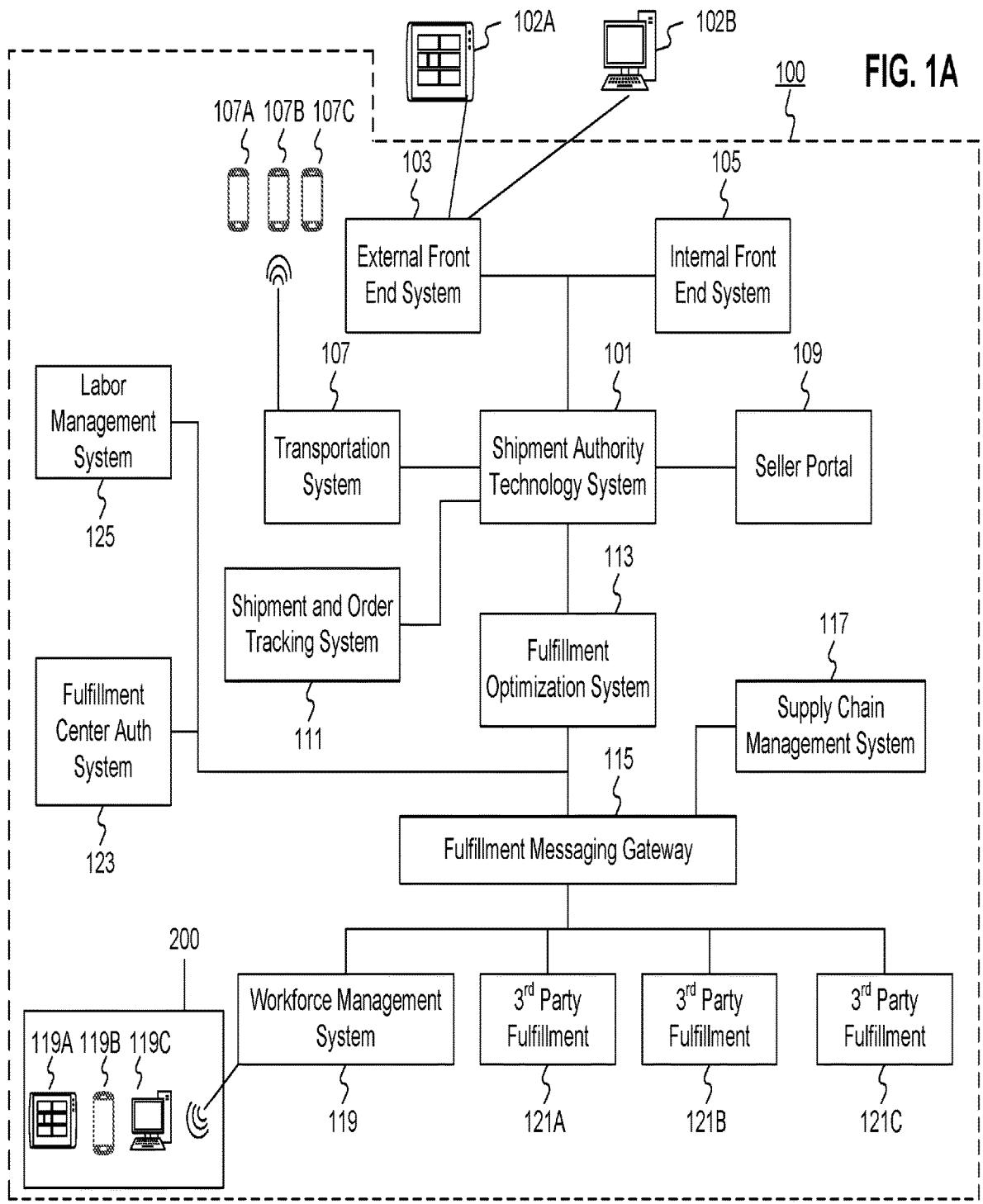
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized systems and methods configured for address correction.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
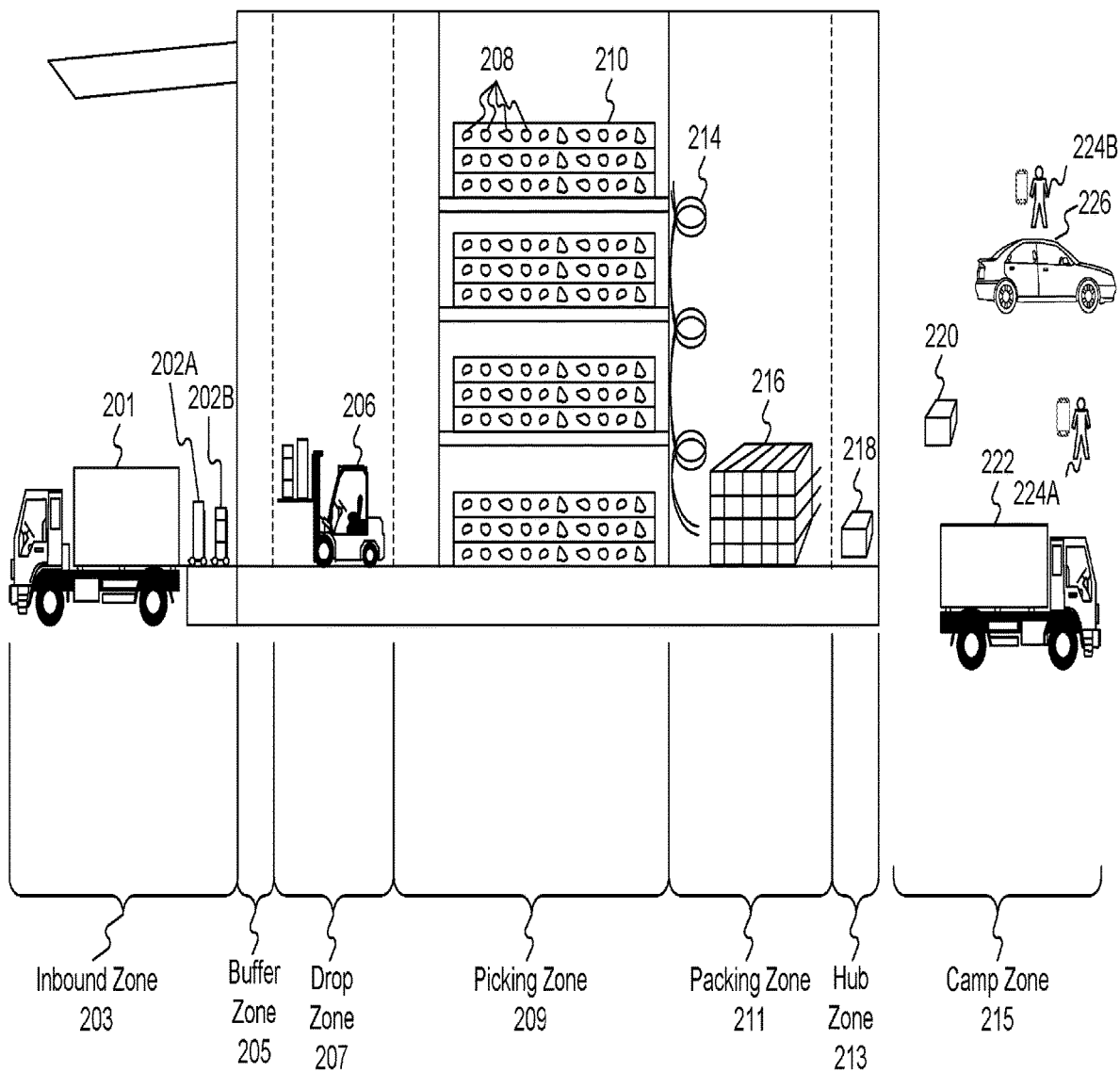
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
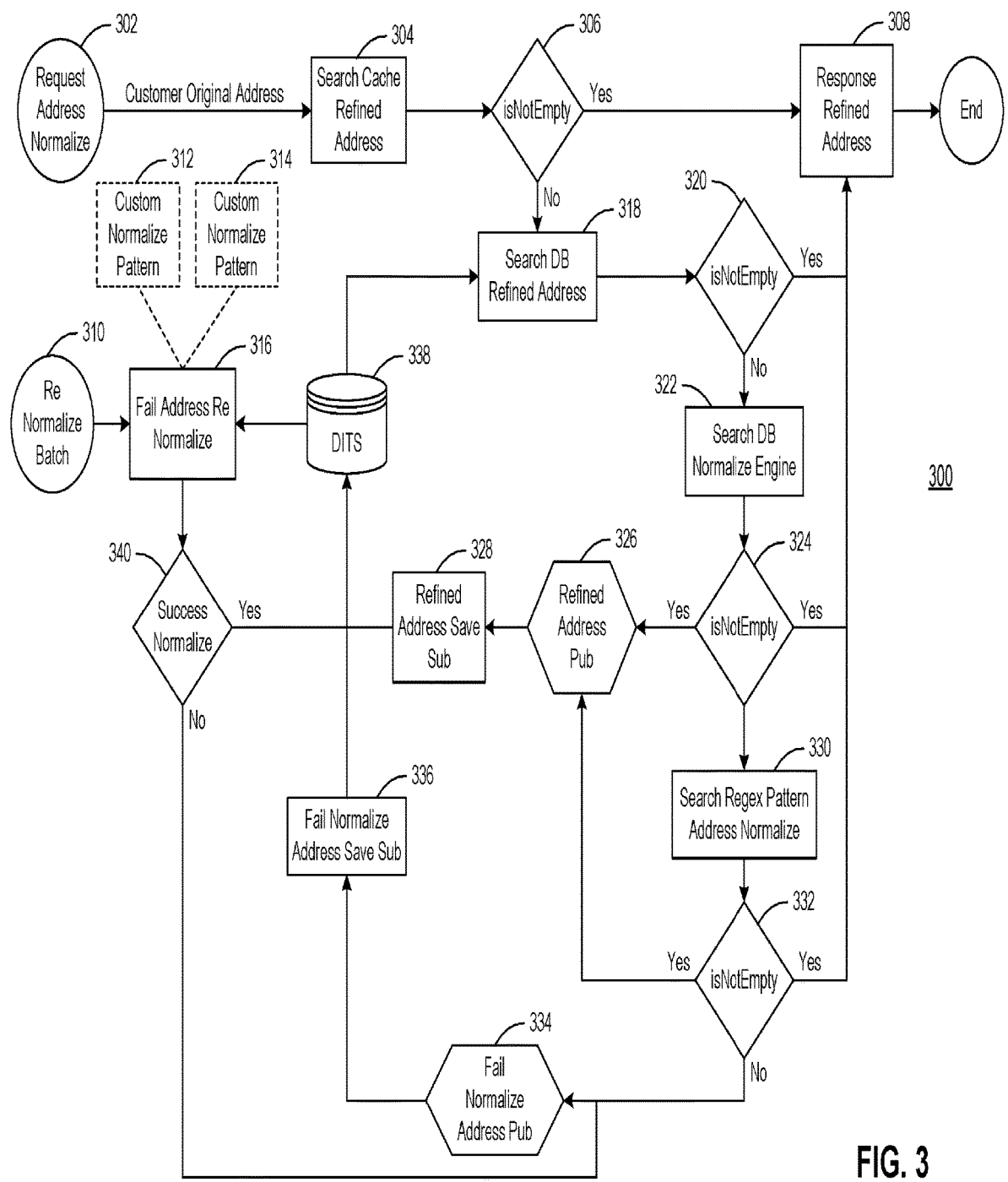
FIG. 3 is a flow chart illustrating an exemplary process for normalization, consistent with the disclosed embodiments.

FIG. 3 is a flow chart illustrating an exemplary process for normalization 300, consistent with the disclosed embodiments. At step 302, external front end system 103 or internal front end system 105 may request an address for normalization. The requested address may include a user's original address or may include any of multiple addresses associated with a user's residential history. At step 304, external front end system 103 or internal front end system 105 may search a cache in order to determine whether or not a more refined version of the requested address exists or is available. For example, "123 Rolling Fork Street" may be refined as "123 Rolling Fork St." and "123 Rolling Fork St." may be currently stored in a cache. Address refinements may include abbreviations or other types of corrections to address information that are currently stored in cache. At step 306, external front end system 103 or internal front end system 105 may run executable code to determine whether cache is empty or not or whether the cache includes a refined address. At step 308, if a refined address already exists in the cache, meaning that cache "isNotEmpty," then a refined address may be returned as the normalized address to a user at a mobile device (e.g., 1196, 107A-107C in FIG. 1).

At step 310, external front end system 103 or internal front end system 105 may also receive a request to normalize an address batch (instead of a single address at step 302), including a plurality of addresses or multiple pieces of address information. For example, the batch may include a pattern for custom normalization address pattern 312 representing a first address that may be similar to a pattern for custom address normalization 314 representing a second address. As an example, "123 Rolling Fork Street" and "123 Rolling Fork Str." may represent two similar patterns compared for normalization. At step 316, if any address in the batch has failed to normalize by failing to conform to a refined address stored in cache 304 or by failing to conform to a predetermined normalization pattern, external front end system 103 or internal front end system 105 may perform a normalization process at step 340 in order to normalize the addresses and reduce redundancy. Accordingly, external front end system 103 or internal front end system 105 may run executable code to generate a single address that may result as a normalized address. As an example, at step 340, "123 Rolling Fork St." may represent the generated normalized address for "123 Rolling Fork Street" and "123 Rolling Fork Str."

Returning to step 306, where an external front end system 103 or internal front end system 105 may run an executable string of code to determine whether cache "isNotEmpty," at step 318, external front end system 103 or internal front end system 105 may determine that the cache does not include a refined address. External front end system 103 or internal front end system 105 may then subsequently proceed to search a database in order to locate a refined address. Similarly, at step 320, external front end system 103 or internal front end system 105 may determine that the database does not include a refined address and may subsequently proceed at step 322 to search a database normalization engine in order to locate a refined address. Further, at step 324, external front end system 103 or internal front end system 105 may determine that the database normalization engine does not include a refined address and may proceed at step 330 to search a regular expression ("regex") pattern address normalization in order to locate a refined address at step 332. Executable strings of code including, for example, "isNotEmpty" may be run by systems 103, 105 in order to search the above mentioned databases.

At step 326, external front end system 103 or internal front end system 105 may locate a refined address and may publish the refined address by updating external front end system 103 or internal front end system 105 with the refined address in place of the requested address at step 302. After publishing the refined address, external front end system 103 or internal front end system 105 may, at step 328, save a sub expression associated with the located refined address. At step 340, after saving, the refined address may be returned as the normalized address to a user at a mobile device (e.g., 119B, 107A-107C in FIG. 1).

Returning to step 330, after searching a regular expression ("regex") pattern address normalization in order to locate a refined address, external front end system 103 or internal front end system 105 may not locate a refined address at step 332. Subsequently, external front end system 103 or internal front end system 105 may publish at step 334 that there was a failure to normalize the address. Subsequently, at step 336, external front end system 103 or internal front end system 105 may indicate as part of a notification or an alert that there was also a failure to normalize and save an associated sub expression. At step 338, Database Information Transmission Station (DITS) may store data indicating that there was a failure to normalize an address and may indicate at step 316 a failure to normalize the address information. This indication may include an alert or notification returned to a user at a mobile device (e.g., 119B, 107A-107C in FIG. 1).

Figure 4:
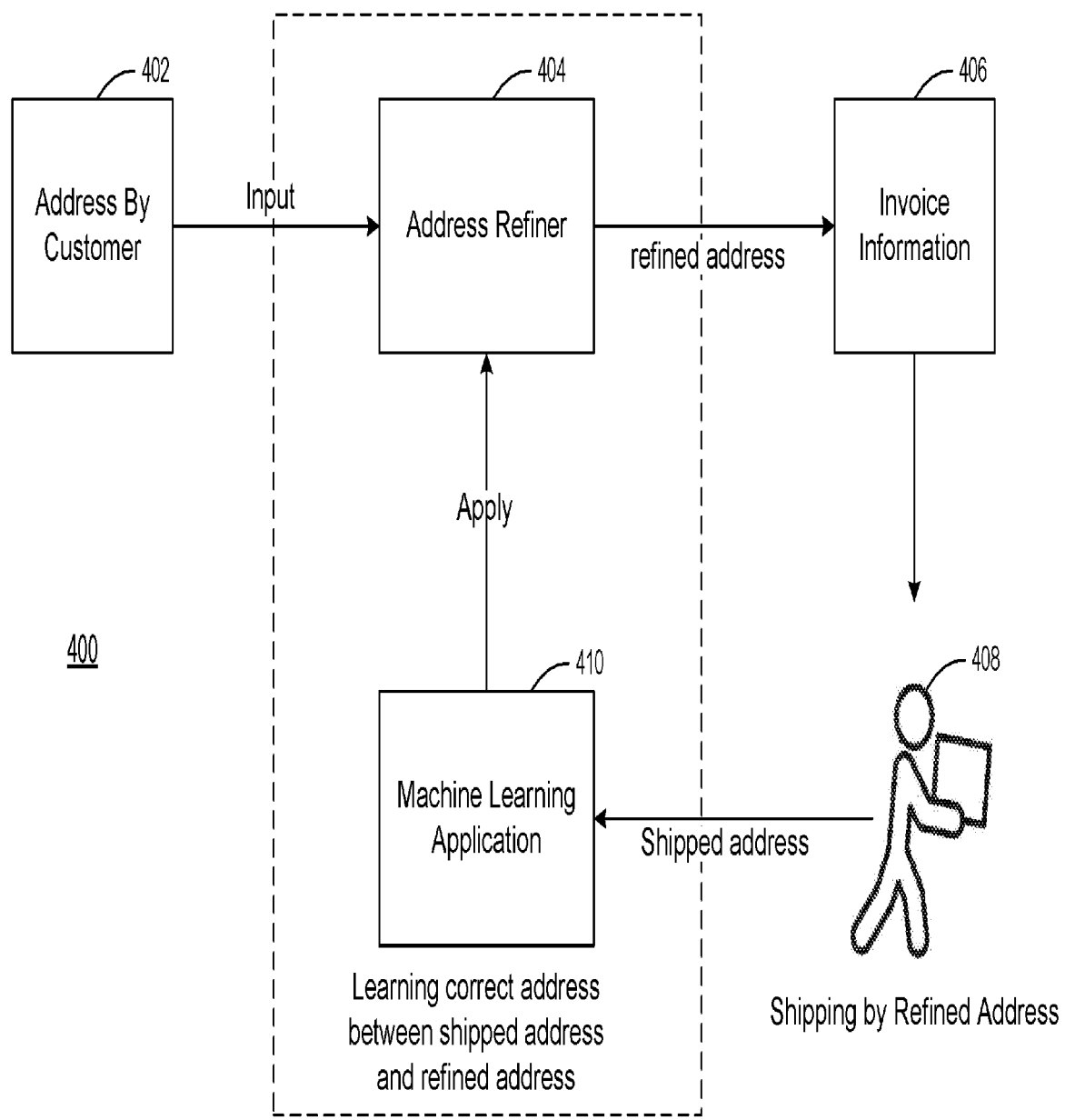
FIG. 4 is a flow chart illustrating an exemplary process for machine learning, consistent with the disclosed embodiments.

FIG. 4 is a flow chart illustrating an exemplary process for machine learning 400, consistent with the disclosed embodiments. At step 402, external front end system 103 or internal front end system 105 may receive an address from a user or customer. At step 404, an address refiner may receive the address from the user or customer as input and may further refine the address (according to steps 304-340 as discussed in the above embodiment and shown in FIG. 3.) The address may be comprise personal, residential, or governmental data. At step 406, the refined address may be included as part of invoice information that may be used at step 408 by a delivery worker as a correct address for delivery or a package, consisted with the disclosed embodiments. Invoice information may include any delivery information relating to a delivery package purchase including purchase price and also a valid delivery address for shipment.

In some embodiments, a shipped address may be different from a refined address that was shipped at step 408 and may be determined to be an incorrect address. External front end system 103 or internal front end system 105 (or a delivery worker) may submit the shipped address into a machine learning application at step 410. A machine learning application at step 410 may then compare a shipped address and a refined address in order to determine a correct address. Subsequently, a machine learning application may apply at step 410 the determined correct address to the address refiner at step 404 for further address refining, processing of invoice information at step 406, and shipping of a refined address at step 408. A machine learning application at step 404 may apply one or more learning curves in order to correct address information as discussed in FIG. 5 below.

Figure 5:
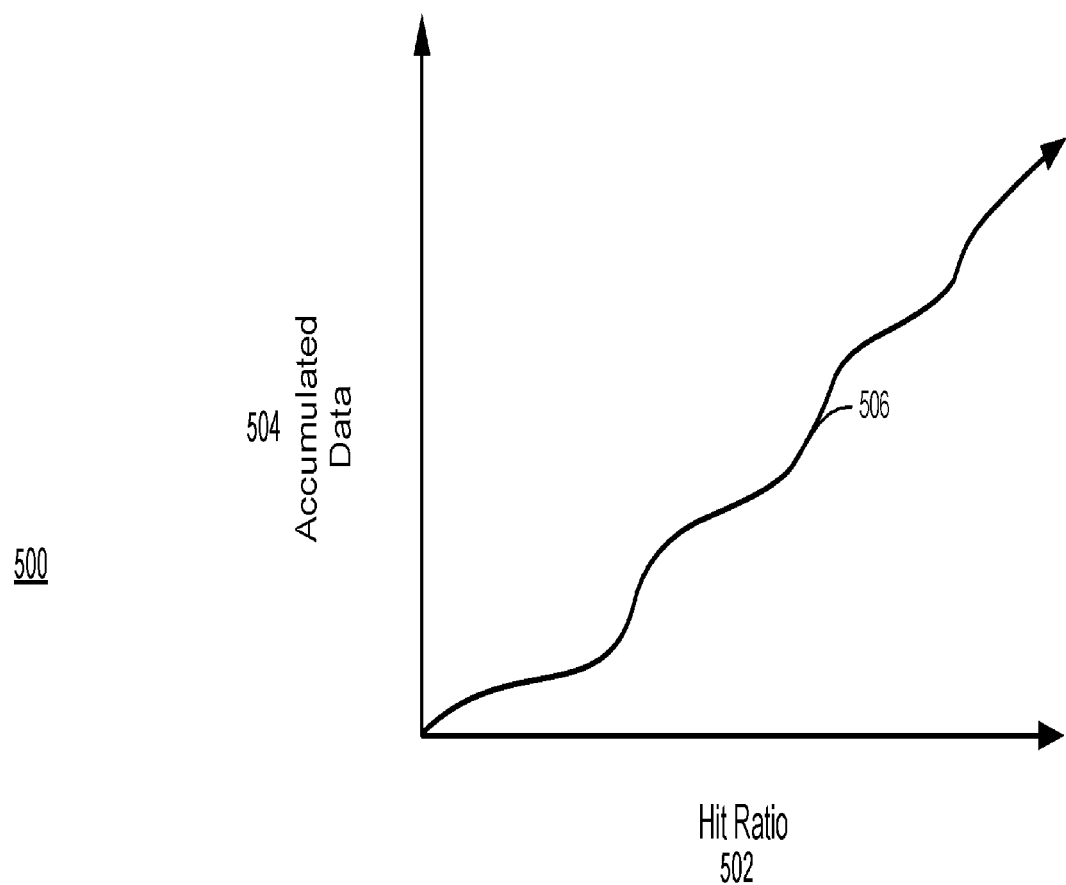
FIG. 5 is a diagrammatic illustration of an exemplary learning curve, consistent with the disclosed embodiments.

FIG. 5 is a diagrammatic illustration of an exemplary learning curve 500, consistent with the disclosed embodiments. External front end system 103 or internal front end system 105 may determine common mistakes that users make and develop patterns for automatic correction of future addresses. External front end system 103 or internal front end system 105 may generate learning curves that represent a relationship between correctness and information accumulation. For example, a hit ratio 502 may be compared with accumulated data 504. For example, a hit ratio 502 may be located on an X-axis, and accumulated address information 504 may be located on a Y-axis. As discussed herein, a hit ratio 502 means a ratio of inputted address accuracy to a stored predetermined correct address. As a hit ratio 502 increases, so does an amount of accumulated data 504. Similarly, as an amount of accumulated address data 504 increases, so does a hit ratio 502. As shown in FIG. 5, a learning curve 506 may appear linear in shape or may possess other curvatures. It would be well understood by one of ordinary skill in the art that as address information is accumulated (504), an accuracy or hit ratio 502 correctly describing an address would increase. External front end system 103 or internal front end system 105 may extrapolate data from the curve 506 as shown in FIG. 5 to determine common mistakes that users make and develop patterns for automatic correction of future addresses. External front end system 103 or internal front end system 105 may wait for a hit ratio 502 and accumulated data 504 to exceed predetermined threshold values before developing patterns for automatic correction of future addresses. Other learning curves (not shown) may be contemplated.

Figure 6:
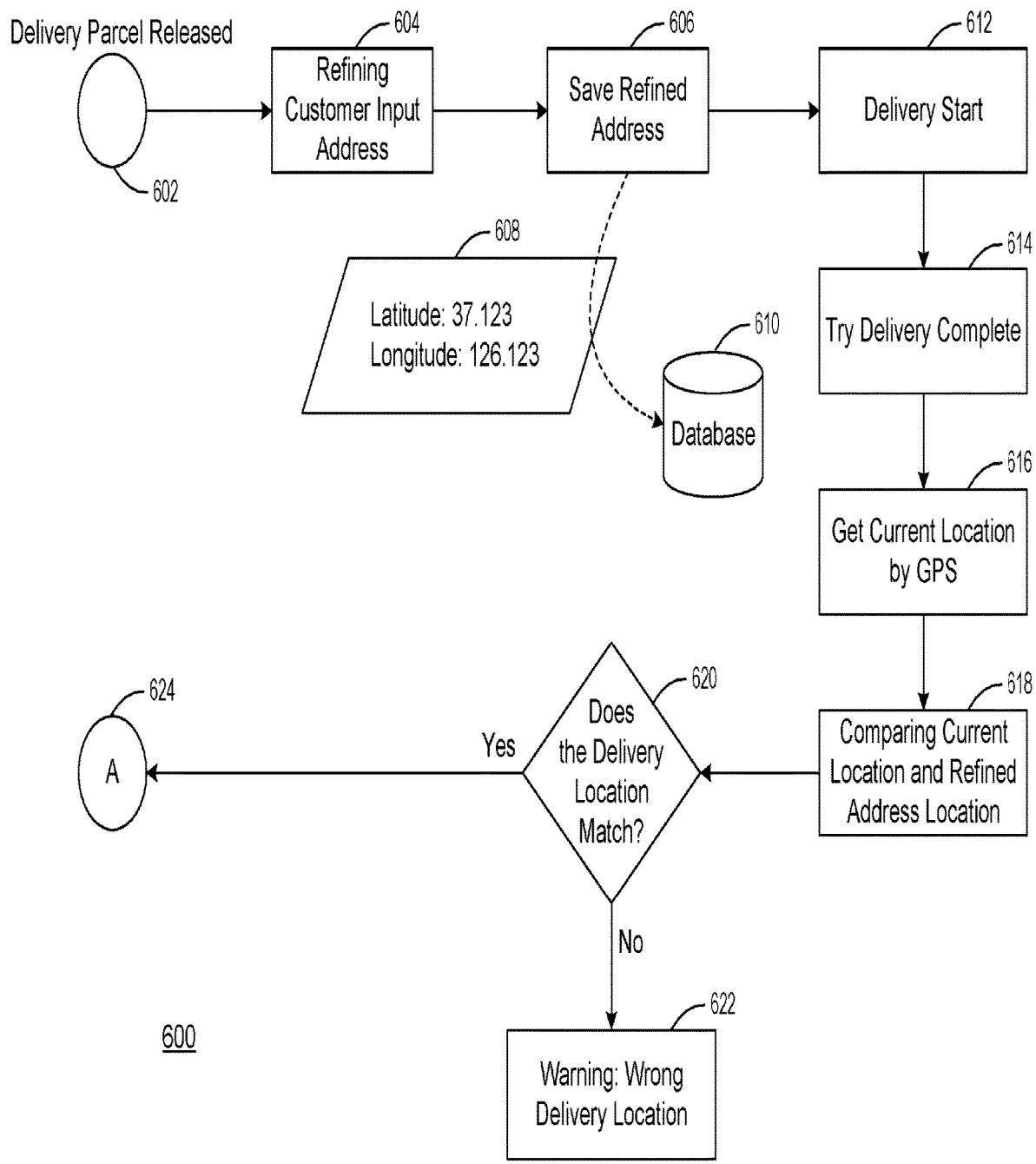
FIG. 6 is a flow chart illustrating an exemplary process for collection of address coordination information, consistent with the disclosed embodiments.

FIG. 6 is a flow chart illustrating an exemplary process for collection of address coordination information 600, consistent with the disclosed embodiments. At step 602, external front end system 103 or internal front end system 105 may release a delivery parcel or package for delivery. At step 604, external front end system 103 or internal front end system 105 may refine a user or customer input address (consistent with the embodiment of FIG. 3), and may save a refined address at step 606 consistent with the above embodiments. As an example, as shown in FIG. 6, saved address information 606 may include latitude or longitude information 608 for delivery and may be stored in database 610. Saved address information 606 may also include street number, street name, city, state, and zip code information.

As shown in FIG. 6, after refined address information is saved in database 610, external front end system 103 or internal front end system 105 may determine that a delivery has commenced or started at a predetermined starting phase or starting time 612. Subsequently, at step 614, external front end system 103 or internal front end system 105 may determine whether or not a delivery is complete. At step 616, external front end system 103 or internal front end system 105 may utilize Global Positioning System (GPS) or other location technologies in order to ascertain a current location of a delivery parcel in transit, when it is determined that a delivery is not yet completed. At step 618, external front end system 103 or internal front end system 105 may compare the current location of a delivery parcel in transit to a refined address's location. At step 620, external front end system 103 or internal front end system 105 may determine whether or not the current location matches with the refined address's location. If there is no match, at step 622, external front end system 103 or internal front end system 105 may issue a warning of a wrong delivery location which may be transmitted to a user. However, if it is determined that the address does match, the delivery will be determined as no longer released at step 624 and coded as arrived "A" or delivered at its proper delivery location. A warning of a wrong delivery location or indication of delivery arrival may be communicated to a user at a mobile device (e.g., 119B, 107A-107C in FIG. 1).

Figure 7:
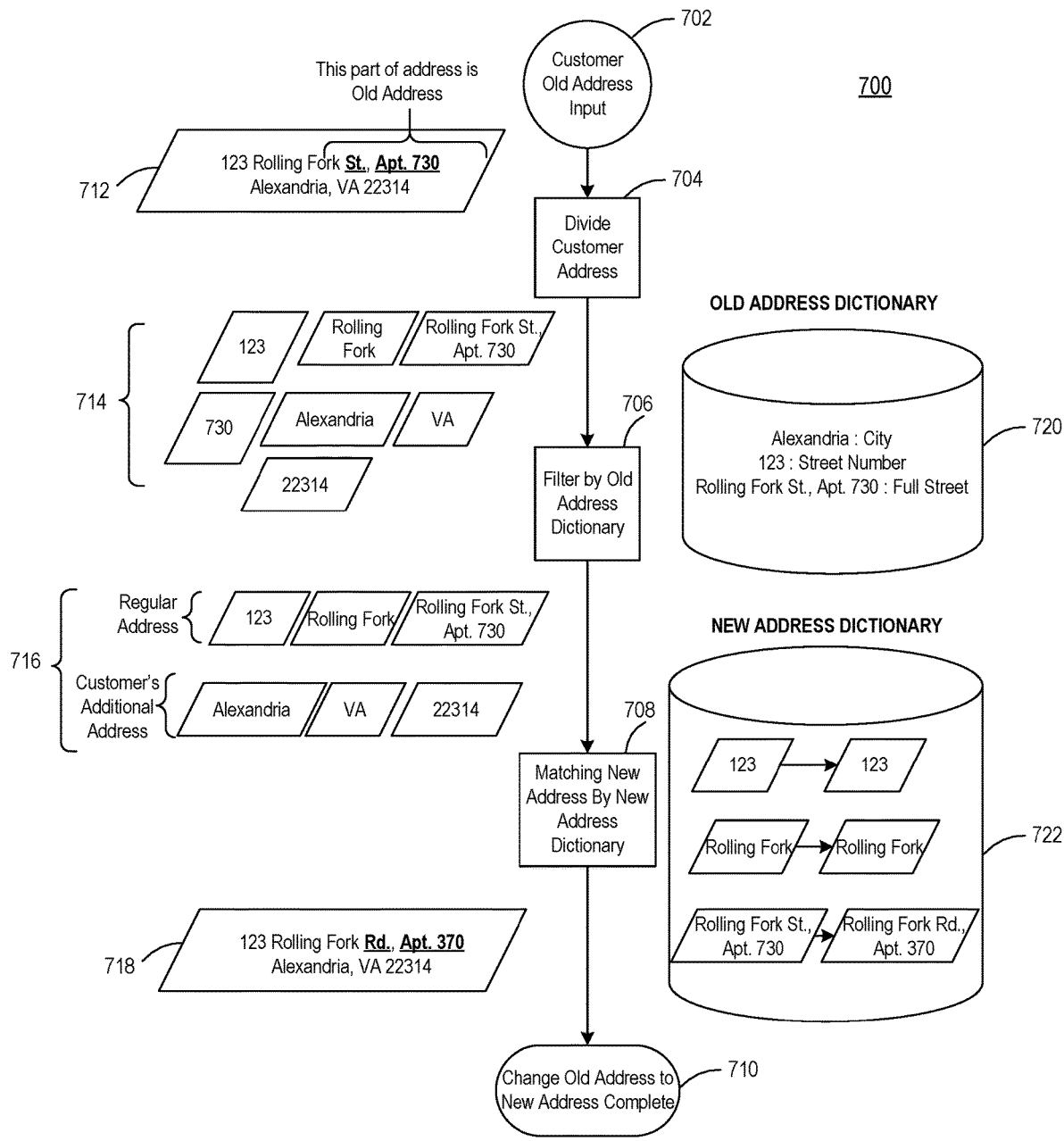
FIG. 7 is a flow chart illustrating an exemplary process for address matching, consistent with the disclosed embodiments.

FIG. 7 is a flow chart illustrating an exemplary process for address matching 700, consistent with the disclosed embodiments. At step 702, a user or a customer may input an old address (or an outdated portion of an address) 712 for use with external front end system 103 or internal front end system 105. For example, as shown in FIG. 7, an address may be "123 Rolling Fork St., Apt. 730, Alexandria, Va. 22314." The old or outdated portion of the address may be "St." and "Apt. 730."

At step 704, external front end system 103 or internal front end system 105 may divide the customer address into component parts 714, including for example, street number, street name, apartment number, city, state, and zip code. As shown in FIG. 7, this may include "123," "Rolling Fork," "Rolling Fork St., Apt. 730," "730," "Alexandria," "VA," or "22314." Other divisions or component parts not shown may be contemplated.

At step 706, external front end system 103 or internal front end system 105 may filter the address using an outdated or old address dictionary 720. As shown in FIG. 7, old address dictionary 720 may include city, street number, full street portions. Old address dictionary 720 may also include other address information portions (not shown) used for filtering. External front end system 103 or internal front end system 105 may filter address information into two portions 716 including a "regular address" that includes street information and a "customer's additional address" that may include city, state, and zip code information.

At step 708, external front end system 103 or internal front end system 105 may match the new address by a new address dictionary 722. For example, "123" may be matched with "123," "Rolling Fork" may be matched with "Rolling Fork," and "Rolling Fork St. Apt. 730" may be matched with "Rolling Fork Rd. Apt. 370." External front end system 103 or internal front end system 105 may determine, based on the matching, that some portions of old address information need to be updated or automatically corrected. Accordingly, at step 710, external front end system 103 or internal front end system 105 may change or replace an old address to a new corrected address 718 such that the new address reads "123 Rolling Fork Rd., Apt. 370, Alexandria, Va. 22314."

Figure 8:
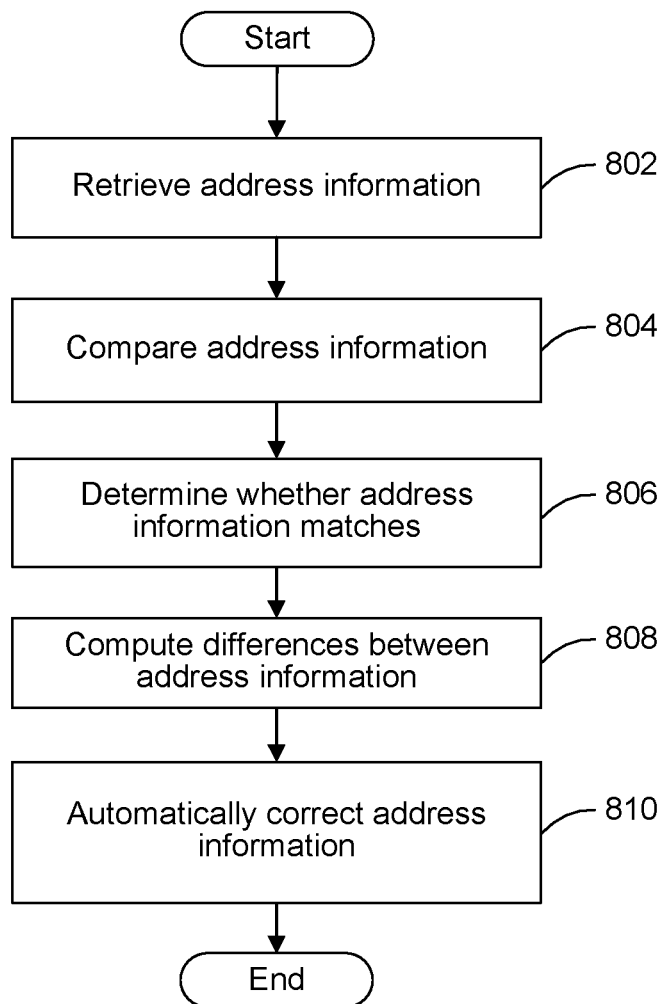
FIG. 8 is a flow chart illustrating an exemplary process for correcting address information, consistent with the disclosed embodiments.

FIG. 8 is a flow chart illustrating an exemplary process for automatic address correction, consistent with the disclosed embodiments. While the exemplary method 800 is described herein as a series of steps, it is to be understood that the order of the steps may vary in other implementations. In particular, steps may be performed in any order, or in parallel.

At step 802, external front end system 103 or internal front end system 105 may receive, from a user device, a first user input including first address information. As shown in FIG. 7, first address information 712 may include a street number, street name, apartment number, city, state, and zip code. Consistent with disclosed embodiments, first address information 712 may include, as an example. "123 Rolling Fork St., Apt. 730, Alexandria, Va. 22314." External front end system 103 or internal front end system 105 may be implemented as a server and may receive the first address information 712 inputted manually by a user at a user interface or automatically from at least one of a web browser on a computer system (e.g., 119A or 119C in FIG. 1), a mobile device (e.g., 119B, 107A-107C in FIG. 1), a database, or the like.

At step 804, external front end system 103 or internal front end system 105 may compare (as also shown in step 618 of FIG. 6), based on the first user input, the first address information 712 against second address information 718, wherein the second address information 718 may be stored in a database. As shown in FIGS. 3, 4, and 6, comparing address information may include normalizing address information or refining address information. For example, custom normalize pattern 312 of a first address may be the same as custom normalize pattern 314 of a second address. At step 316, if an address has failed to normalize over the course of multiple analogous iterations including "123 Rolling Fork Street" and "123 Rolling Fork Str.," a normalization process at step 340 may take place as shown in FIG. 3 in order to normalize the address and reduce redundancy. Accordingly, a single address may result as a normalized address. As an example, "123 Rolling Fork St." may represent the normalized address for "123 Rolling Fork Street" and "123 Rolling Fork Str."

Comparing address information may also include refining address information. As shown in FIG. 4, at step 404, external front end system 103 or internal front end system 105 may include an address refiner configured to receive address 402 from the user or customer as input and may further refine the address (as also discussed in steps 304-340 above and shown in FIG. 3.) For example, at step 304, external front end system 103 or internal front end system 105 may search cache in order to determine whether or not a more refined version of the requested address exists or is available. For example, "123 Rolling Fork Street" may be refined as "123 Rolling Fork St." Address refinements may include abbreviations or other corrections to a request address. At step 306, external front end system 103 or internal front end system 105 may run an executable string of code to determine whether cache "isNotEmpty." At step 308, if a refined address already exists in cache meaning that cache ""isNotEmpty," then a refined address may be returned to a user at a mobile device (e.g., 119B, 107A-107C in FIG. 1).

As shown in FIG. 7, second address information 718 may also include a street number, street name, apartment number, city, state, and zip code. Second address information 718 may also include at least one of stored location data, stored map data, known address region or neighborhood divisions, and a residence title. The second address information may have been originally been entered in external front end system 103 or internal front end system 105 by a user (e.g., a delivery workers, a customer, or a customer support worker) in any of a web browser on a computer system (e.g., 119A or 119C in FIG. 1), a mobile device (e.g., 119B, 107A-107C in FIG. 1), a database, or the like. As shown in FIG. 7, first address information 712 may be compared to second address information 718 residing in old address dictionary 720 and new address dictionary 722. Other methods for comparison may be contemplated, consistent with disclosed embodiments.

At step 806, external front end system 103 or internal front end system 105 may determine, based on the comparison, whether the first address information matches the second address information (see also step 618). External front end system 103 or internal front end system 105 may communicate, based on the determination that the first address information matches the second address information, a notification to the user that there are differences/a wrong location (FIG. 6, step 622) or no differences between the first address information and the second address information. The notification may include any of an alert or message that may be sent to delivery workers, customers, or customer support. The notification may be displayed on a graphical user interface (GUI) and may allow for the user to indicate receipt of the message indicating that the user is aware that there are no differences between the first address information and the second address information. Differences may include misspellings, non-standardization of address information, typographical errors, differences in numerals, differences in spacing, differences in capitalization, or any other abnormal differences detected between first address information and second address information.

As an example, as shown in FIG. 6 at step 620, external front end system 103 or internal front end system 105 may determine whether or not the current location matches with the refined address's location. If there is no match, at step 622, a warning of a wrong delivery location may be transmitted to a user. However, if it is determined that the addresses match, the delivery will be determined as no longer released at step 624 and coded as arrived "A" or delivered at its proper delivery location.

As another example, as shown in FIG. 7 at step 708, external front end system 103 or internal front end system 105 may match the new address by a new address dictionary. For example, "123" may be matched with "123," "Rolling Fork" may be matched with "Rolling Fork," and "Rolling Fork St. Apt. 730" may be matched with "Rolling Fork Rd. Aprt. 370." Finally, at step 710, external front end system 103 or internal front end system 105 may change or replace an old address to a new address such that the new address reads "123 Rolling Fork Rd., Apt. 370, Alexandria, Va. 22314." Other methods for determining whether address information matches may be contemplated, consistent with disclosed embodiments.

At step 808, external front end system 103 or internal front end system 105 may compute, based on a determination that the first address information does not match the second address information (as shown in FIGS. 6 and 7, and discussed above at steps 622 and 708), first differences between the first address information and the second address information. The matching may be determined as part of a comparison between the first address information and the second address information. External front end system 103 or internal front end system 105 may communicate, based on the first differences exceeding a predetermined threshold (as shown in FIG. 6 and discussed above at step 618), a notification 622 to the user that the first address information does not match stored address information in the database. The predetermined threshold may include a predetermined number of differences from the second address information, and wherein the differences include at least one of differences in numbers, street names, postal codes, city names, and district names. The predetermined threshold may also include only a single difference or the absence of exact matching of address information. The predetermined threshold may also be configured for comparison of only one or more of identified misspellings, non-standardization of address information, typographical errors, differences in numerals, differences in spacing, differences in capitalization, or any other differences between first address information and second address information. Multiple predetermined thresholds may be contemplated.

As an example, at step 704, external front end system 103 or internal front end system 105 may divide the customer address into component parts, including for example, street number, street name, apartment number, city, state, and zip code. As shown in FIG. 7, this may include "123," "Rolling Fork," "Rolling Fork St., Apt. 730," "730," "Alexandria," "VA," or "22314." Component part "123" may be matched with "123," "Rolling Fork" may be matched with "Rolling Fork," and "Rolling Fork St. Apt. 730" may be matched with "Rolling Fork Rd. Apt. 370" in order compute the differences in apartment number (e.g. 730 vs. 370) and street name (e.g. St. vs. Rd.) between the two addresses.

In some embodiments, external front end system 103 or internal front end system 105 may store corrected address information in addition to first and second address information. For example, external front end system 103 or internal front end system 105 may store corrected third address information and corrected fourth address information. External front end system 103 or internal front end system 105 may also store this address information in a database, and determine, based on multiple differences (including the identified first differences, second differences, third differences, or additional differences), common differences that exist for multiple user inputs (including, but not limited to, first, second, and third user inputs) corresponding to input of address information. External front end system 103 or internal front end system 105 may also develop, based on the determination of common differences, a corrective pattern to correct future user input that includes address information. The server may generate, by the processor, a learning curve 506 (as shown in FIG. 5 as discussed above) based on any or all of the corrected address information, develop, based on the determination of common differences, one or more corrective patterns, and modify, based on the generation of a learning curve 506 and the corrective patterns, the predetermined threshold for correcting inputted address information (see FIG. 7 as discussed above).

As an example, one or more corrective patterns may include normalization or refinement patterns for address information, consistent with the exemplary processes of FIGS. 3 and 4. In addition to one or more corrective patterns, one or more learning curves 506 may be generated in order to develop the one or more corrective patterns for automatic address correction of a future address input. External front end system 103 or internal front end system 105 may determine common mistakes that users make and develop patterns for automatic correction of future addresses. As shown in FIG. 4, corrective patterns may be inputted into machine learning application at step 410. Machine learning application at step 410 may then compare corrective patterns to received address information in order to provide for automatic address correction of a future address input.

At step 810, external front end system 103 or internal front end system 105 operating as a server may automatically correct, based on differences not exceeding a predetermined threshold, first address information to match second address information. As an example, as shown in FIG. 7 at step 710, external front end system 103 or internal front end system 105 may automatically change or replace an old address to a new address such that the new address reads "123 Rolling Fork Rd., Apt. 370, Alexandria, Va. 22314" instead of "123 Rolling Fork St., Apt. 730, Alexandria, Va. 22314"

In some aspects, external front end system 103 or internal front end system 105 may receive, from the user, a second user input including third address information; compare, based on the second user input, the third address information against the second address information; and determine, based on the comparison, whether the third address information matches the second address information. In other aspects, external front end system 103 or internal front end system 105 may receive, from the user, a new user input including new address information (e.g. third, fourth, or fifth address information); compare, based on the new user input, the new address information against stored address information; and determine, based on the comparison of the new address information to the stored information, whether the new address information matches the stored address information, consistent with disclosed embodiments. In further aspects, external front end system 103 or internal front end system 105 may compute, based on a determination that additional address information (e.g. different from newly entered address information) does not match the stored address information, entirely new differences between the additional address information and the stored address information, and correct, based on these differences not exceeding the predetermined threshold, the additional address information to match the stored address information, consistent with disclosed embodiments.

In other aspects, external front end system 103 or internal front end system 105 may compute, based on the determination that new address information does not match the stored address information, differences between the new address information and the stored address information, and may correct, based on the differences not exceeding any predetermined thresholds, the new address information to match the stored address information. In some aspects, external front end system 103 or internal front end system 105 may allow for searching for the address information provided by the user at step 802, and returning, based on the searched first address information, the corrected address information. In some embodiments, inputting a search query at step 802 may trigger a system (e.g., external front end system 103 or internal front end system 105) to perform steps 804-810 and to correct received address information. In some embodiments, exemplary process 800 may send corrected address information to one or more devices (e.g., the device sending the input in step 802). For example, in a situation where a customer device (e.g., 102B in FIG. 1) sends an address as part of completing an online shopping order, external front end system 103 may respond by sending corrected address information to customer device 102B to request confirmation of the corrected address information as well as to other devices (e.g., SAT system 101 or seller portal 109) in order to initiate ordering of the item.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for correcting address information, the system comprising:
    a memory storing instructions; and
    at least one processor configured to execute the instructions to:
        receive, from a user device, an address for normalization, wherein the address is one of a current address or a historical residential address of a user;
        normalize the address;
        compare a location associated with the normalized address to a current location of a delivery worker;
        based on a determination that the normalized address location does not match the current location of the delivery worker, transmit a warning to the user device;
        correct the normalized address, based on a machine learning process;
        store, based on the correction, the corrected normalized address in a database;
        provide instructions to a mobile device of the delivery worker to deliver a package to the user at a delivery location based on the corrected normalized address;
        generate, by the processor, a learning curve based on the corrected normalized address information;
        develop, based on a determination of common differences, a corrective pattern; and
        modify, based on the generation of a learning curve and the corrective pattern, a predetermined threshold for correcting inputted address information.

2. The computer-implemented system of claim 1, wherein the determination that the normalized address location does not match the current location of the delivery worker comprises
    determining that an amount of detected differences between the normalized address location and the current location of the delivery worker exceeds a predetermined threshold.

3. The computer-implemented system of claim 2, wherein the predetermined threshold includes a predetermined number of differences between the normalized address location and the current location of the delivery worker, and wherein the differences include at least one of differences in numbers, street names, zip codes, city names, and district names.

4. The computer-implemented system of claim 1, wherein the location of the delivery worker includes at least one of stored location data, stored map data, region, neighborhood divisions, or a residence title.

5. The computer-implemented system of claim 1, wherein the at least one processor is further configured to execute the instructions to:
    compare, while the package is in transit, the normalized address location to address information stored in a database, wherein the database includes a dictionary of address terms.

6. The computer-implemented system of claim 1, wherein the at least one processor is further configured to execute the instructions to:
    develop, based on a determination of multiple differences between the normalized address and the current location of the delivery worker, a corrective pattern to correct future user input that includes address information.

7. The computer-implemented system of claim 1, wherein the at least one processor is further configured to execute the instructions to:
    receive the user input including requested address information from the user from at least one of a web browser, a mobile device, or a user database.

8. A computer-implemented method for correcting address information, the method comprising:
    receiving, from a user device, an address for normalization, wherein the address is one of a current address or a historical residential address of a user;
    normalizing the address;
    comparing a location associated with the normalized address to a current location of a delivery worker;
    based on a determination that the normalized address location does not match the current location of the delivery worker, transmitting a warning to the user device;
    correcting the normalized address, based on a machine learning process;
    storing, based on the correction, the corrected normalized address in a database;
    providing instructions to a mobile device of the delivery worker to deliver a package to the user at a delivery location based on the corrected normalized address;
    generating, by the processor, a learning curve based on the corrected normalized address information;
    developing, based on a determination of common differences, a corrective pattern; and
    modifying, based on the generation of a learning curve and the corrective pattern, a predetermined threshold for correcting inputted address information.

9. The computer-implemented method of claim 8, the method comprising:
    communicating, if it is determined that an amount of detected differences between the normalized address location and the current location of the delivery worker exceeds a predetermined threshold, a notification to the user that the normalized address location does not match the current location of the delivery worker.

10. The computer-implemented method of claim 8, the method comprising:
   receiving the user input including requested address information from the user from at least one of a web browser, a mobile device, or a user database.

11. The computer-implemented method of claim 8, wherein the location of the delivery worker includes at least one of stored location data, stored map data, region, neighborhood divisions, or a residence title.

12. The computer-implemented method of claim 8, the method comprising:
   comparing, while the package is in transit, the normalized address location to address information stored in a database, wherein the database includes a dictionary of address terms.

13. The computer-implemented method of claim 8, wherein the at least one processor is further configured to execute the instructions to:
   develop, based on a determination of multiple differences between the normalized address and the current location of the delivery worker, a corrective pattern to correct future user input that includes address information.

14. The computer-implemented method of claim 8, wherein the predetermined threshold includes a predetermined number of differences between the normalized address location and the current location of the delivery worker, and wherein the differences include at least one of differences in numbers, street names, zip codes, city names, and district names.

15. A non-transitory computer readable medium comprising executable instructions that when executed by at least one processing device cause the at least one processing device to correct address information and perform operations comprising:
   receiving, from a user device, an address for normalization, wherein the address is one of a current address or a historical residential address of a user;
   normalizing the address;
   comparing a location associated with the normalized address to a current location of a delivery worker;
   based on a determination that the normalized address location does not match the current location of the delivery worker, transmitting a warning to the user device;
   correcting the normalized address, based on a machine learning process;
   storing, based on the correction, the corrected normalized address in a database;
   providing instructions to a mobile device of the delivery worker to deliver a package to the user at a delivery location based on the corrected normalized address;
   generating, by the processor, a learning curve based on the corrected normalized address information;
   developing, based on a determination of common differences, a corrective pattern; and
   modifying, based on the generation of a learning curve and the corrective pattern, a predetermined threshold for correcting inputted address information.

16. The non-transitory computer readable medium of claim 15, wherein the determination that the normalized address location does not match the current location of the delivery worker comprises:
   determining that an amount of detected differences between the normalized address location and the current location of the delivery worker exceeds a predetermined threshold.

17. The non-transitory computer readable medium of claim 15, wherein the operations further comprise:
   receiving the user input including requested address information from the user from at least one of a web browser, a mobile device, or a user database.

* * * * *